United States Patent
Chen

(10) Patent No.: US 8,280,948 B1
(45) Date of Patent: Oct. 2, 2012

(54) SYSTEM AND METHOD FOR ENABLING ONLINE COLLABORATION AMONGST A PLURALITY OF TERMINALS USING A WEB SERVER

(75) Inventor: Shenchang Eric Chen, Los Gatos, CA (US)

(73) Assignee: Persony Inc., Los Gatos, CA (US)

( * ) Notice: Subject to any disclaimer, the term of this patent is extended or adjusted under 35 U.S.C. 154(b) by 0 days.

(21) Appl. No.: 12/576,433

(22) Filed: Oct. 9, 2009

Related U.S. Application Data

(63) Continuation of application No. 11/090,777, filed on Mar. 25, 2005.

(60) Provisional application No. 60/577,967, filed on Jun. 8, 2004.

(51) Int. Cl.
*G06F 15/16* (2006.01)

(52) U.S. Cl. .......................................................... 709/203

(58) Field of Classification Search .................. 709/203, 709/204, 205
See application file for complete search history.

(56) References Cited

U.S. PATENT DOCUMENTS

| | | | | |
|---|---|---|---|---|
| 5,713,017 A * | 1/1998 | Lin et al. ................................ | 1/1 |
| 5,892,954 A * | 4/1999 | Tomas et al. ................... | 710/200 |
| 6,012,086 A * | 1/2000 | Lowell ............................. | 709/218 |
| 6,149,441 A * | 11/2000 | Pellegrino et al. ............. | 434/350 |
| 6,182,073 B1 * | 1/2001 | Kukkal .................... | 1/1 |
| 6,192,394 B1 * | 2/2001 | Gutfreund et al. ............ | 709/204 |
| 6,230,171 B1 * | 5/2001 | Pacifici et al. ................. | 715/201 |
| 6,289,333 B1 * | 9/2001 | Jawahar et al. ....................... | 1/1 |
| 6,295,551 B1 * | 9/2001 | Roberts et al. ................. | 709/205 |
| 6,336,135 B1 * | 1/2002 | Niblett et al. .................. | 709/215 |
| 6,421,738 B1 * | 7/2002 | Ratan et al. ..................... | 719/328 |
| 6,573,915 B1 * | 6/2003 | Sivan et al. ..................... | 715/781 |
| 6,636,888 B1 * | 10/2003 | Bookspan et al. ............. | 709/203 |
| 6,675,216 B1 * | 1/2004 | Quatrano et al. .............. | 709/229 |
| 6,728,753 B1 * | 4/2004 | Parasnis et al. ................ | 709/203 |
| 6,732,145 B1 * | 5/2004 | Aravamudan et al. ......... | 709/204 |
| 6,760,749 B1 * | 7/2004 | Dunlap et al. .................. | 709/204 |
| 6,957,199 B1 * | 10/2005 | Fisher .............................. | 705/78 |
| 6,958,981 B1 * | 10/2005 | Hemminger ................... | 370/270 |
| 7,062,532 B1 * | 6/2006 | Sweat et al. .................... | 709/205 |
| 7,089,279 B1 * | 8/2006 | Sakaguchi ....................... | 709/203 |
| 7,143,137 B2 * | 11/2006 | Maufer et al. .................. | 709/205 |
| 7,149,776 B1 * | 12/2006 | Roy et al. ........................ | 709/205 |
| 7,203,755 B2 * | 4/2007 | Zhu et al. ........................ | 709/227 |
| 7,328,239 B1 * | 2/2008 | Berberian et al. .............. | 709/204 |
| 7,330,875 B1 * | 2/2008 | Parasnis et al. ................ | 709/204 |
| 7,353,252 B1 * | 4/2008 | Yang et al. ...................... | 709/204 |
| 7,370,269 B1 * | 5/2008 | Prabhu et al. .................. | 715/230 |
| 7,970,263 B1 * | 6/2011 | Asch ............................... | 386/350 |
| 2001/0016873 A1 * | 8/2001 | Ohkado et al. ................. | 709/205 |
| 2002/0016788 A1 * | 2/2002 | Burridge ......................... | 707/10 |
| 2002/0029245 A1 * | 3/2002 | Nahon et al. ................... | 709/204 |

(Continued)

*Primary Examiner* — Imad Hussain
(74) *Attorney, Agent, or Firm* — Sheridan Ross P.C.

(57) ABSTRACT

Data may be made available to one or more participants of an online collaboration session through use of a client system that generates or otherwise captures the data to be shared, and then formats that data for use by general-purpose server resources. In one embodiment, data from the operation of an application on the client system is captured. A formatted data set that is suitable for the client-server communications is prepared from the captured data. The formatted data set may be configured with characteristics to enable the server to respond to requests from one or more participant terminals of the online collaboration session. During the session, the formatted data set may be transmitted to the server in one or more discrete and independent communications.

22 Claims, 14 Drawing Sheets

U.S. PATENT DOCUMENTS

| | | | |
|---|---|---|---|
| 2002/0035451 A1* | 3/2002 | Rothermel | 703/1 |
| 2002/0035603 A1* | 3/2002 | Lee et al. | 709/205 |
| 2002/0042830 A1* | 4/2002 | Bose et al. | 709/230 |
| 2002/0083134 A1* | 6/2002 | Bauer et al. | 709/204 |
| 2002/0091762 A1* | 7/2002 | Sohn et al. | 709/203 |
| 2002/0095460 A1* | 7/2002 | Benson | 709/204 |
| 2002/0106190 A1* | 8/2002 | Nygren et al. | 386/68 |
| 2002/0120939 A1* | 8/2002 | Wall et al. | 725/87 |
| 2002/0129106 A1* | 9/2002 | Gutfreund | 709/205 |
| 2002/0138624 A1* | 9/2002 | Esenther | 709/227 |
| 2003/0041108 A1* | 2/2003 | Henrick et al. | 709/205 |
| 2003/0055893 A1* | 3/2003 | Sato et al. | 709/204 |
| 2003/0061286 A1* | 3/2003 | Lin | 709/205 |
| 2003/0085923 A1* | 5/2003 | Chen et al. | 345/751 |
| 2003/0105819 A1* | 6/2003 | Kim et al. | 709/205 |
| 2003/0225764 A1* | 12/2003 | Smith et al. | 707/9 |
| 2004/0003043 A1* | 1/2004 | Rajamony et al. | 709/205 |
| 2004/0032424 A1* | 2/2004 | Florschuetz | 345/748 |
| 2004/0133639 A1* | 7/2004 | Shuang et al. | 709/204 |
| 2004/0135820 A1* | 7/2004 | Deaton et al. | 345/848 |
| 2004/0155910 A1* | 8/2004 | Chang et al. | 345/904 |
| 2004/0193683 A1* | 9/2004 | Blumofe | 709/204 |
| 2004/0199580 A1* | 10/2004 | Zhakov et al. | 709/204 |
| 2004/0230447 A1* | 11/2004 | Schwerin-Wenzel et al. | 705/1 |
| 2005/0010640 A1* | 1/2005 | Cannata et al. | 709/205 |
| 2005/0015508 A1* | 1/2005 | Hankejh et al. | 709/230 |
| 2005/0033656 A1* | 2/2005 | Wang et al. | 705/26 |
| 2005/0044499 A1* | 2/2005 | Allen et al. | 715/704 |
| 2005/0055306 A1* | 3/2005 | Miller et al. | 705/37 |
| 2005/0097159 A1* | 5/2005 | Skidgel | 709/200 |
| 2005/0097470 A1* | 5/2005 | Dias et al. | 715/723 |
| 2005/0154679 A1* | 7/2005 | Bielak | 705/59 |
| 2005/0163062 A1* | 7/2005 | Salesky et al. | 370/260 |
| 2005/0216528 A1* | 9/2005 | Cheng | 707/202 |
| 2006/0173702 A1* | 8/2006 | Saxena et al. | 705/1 |
| 2006/0184410 A1* | 8/2006 | Ramamurthy et al. | 705/8 |
| 2006/0277454 A1* | 12/2006 | Chen | 715/500.1 |
| 2007/0168931 A1* | 7/2007 | Martin et al. | 717/104 |
| 2007/0208808 A1* | 9/2007 | Rust | 709/204 |

* cited by examiner

DATA TRANSMISSION FROM CLIENT SYSTEM

DATA TRANSMISSION TO APPLICATION CLIENT SYSTEM

DATA TRANSMISSION TO BROWSER-CLIENT SYSTEM

Messages to Lisa

Tom> Welcome to the meeting.
Lisa> Glad to be here

Messages to Brian

Tom> Do you have a question?
Brian> I don't think I have.

SYSTEM AND METHOD FOR ENABLING ONLINE COLLABORATION AMONGST A PLURALITY OF TERMINALS USING A WEB SERVER

RELATED APPLICATIONS

This application is a continuation of U.S. patent application Ser. No. 11/090,777, entitled "System and Method For Enabling Online Collaboration Amongst a Plurality of Terminals Using a Web Server," filed on Mar. 25, 2005; and claims benefit of priority to Provisional U.S. Patent Application No. 60/577,967, entitled "Online Collaboration Using Web Servers," filed Jun. 8, 2004. The aforementioned priority applications are hereby incorporated by reference in their entirety for all purposes.

TECHNICAL FIELD

The disclosed embodiments relate generally to the field network communications. In particular, the disclosed embodiments relate to a system and method for enabling online collaboration amongst a plurality of terminals using a web server.

BACKGROUND

Online collaboration refers to two or more people collaborating or meeting remotely using computers to share documents, desktop applications, presentation slides, messages or multimedia data. In order to share information remotely, each collaborator's computer needs to communicate with the computer(s) of the other collaborators, either directly or indirectly. When computers are linked directly to each other, the communication model is termed peer-to-peer. Conversely, when one computer makes a request to the other computer indirectly via a server computer, the model is termed client-server (CS).

Online collaboration systems exist in both peer-to-peer and CS models. Peer-to-peer collaboration products such as Microsoft NetMeeting or AT&T Virtual Network Computing, are often limited to use by computers that are on the same network as they are not firewall friendly. A network firewall normally precludes an external computer from directly connecting to an internal computer. Moreover, peer-to-peer requires at least one of the peer computers to have a public IP address, an address publicly registered with the Network Information Center (NIC) that can be accessed by other computer over the Internet. Most corporate or home computers do not have public IP addresses, as such addresses are of limited supply. Peer-to-peer collaboration models are also limited in the number of participants they can accommodate, because each computer participating in the online collaboration session needs to be connected to all the others. The number of connections grows exponentially to the number of people collaborating.

Client-server online collaboration models require the installation, operation and maintenance of a proprietary application server. Such servers are responsible for routing and responding to client computer's requests. The client-server online collaboration model can scale to large number of users since each client computer only need to connect to the server. This model also addresses the firewall and IP problems as only the server needs to be outside of a firewall and has a public IP address. However, the proprietary application server used in such models requires an open channel with the collaboration participants during a session. They also require proprietary communication protocols that are computationally intensive. To this end, the server typically needs to be connected to a high-speed network and operated by IT specialists at high costs. Industry average of the annual cost of operating an enterprise server is at 3 to 6 times the cost of the server software. Many users end up using hosted services provided by application-service providers (ASP) and pay a monthly management fee.

BRIEF DESCRIPTION OF THE DRAWINGS

FIGS. 8A-8G illustrate sample displays generated from a user-interface of client application 108, under an embodiment of the invention.

DETAILED DESCRIPTION

Figure 1:
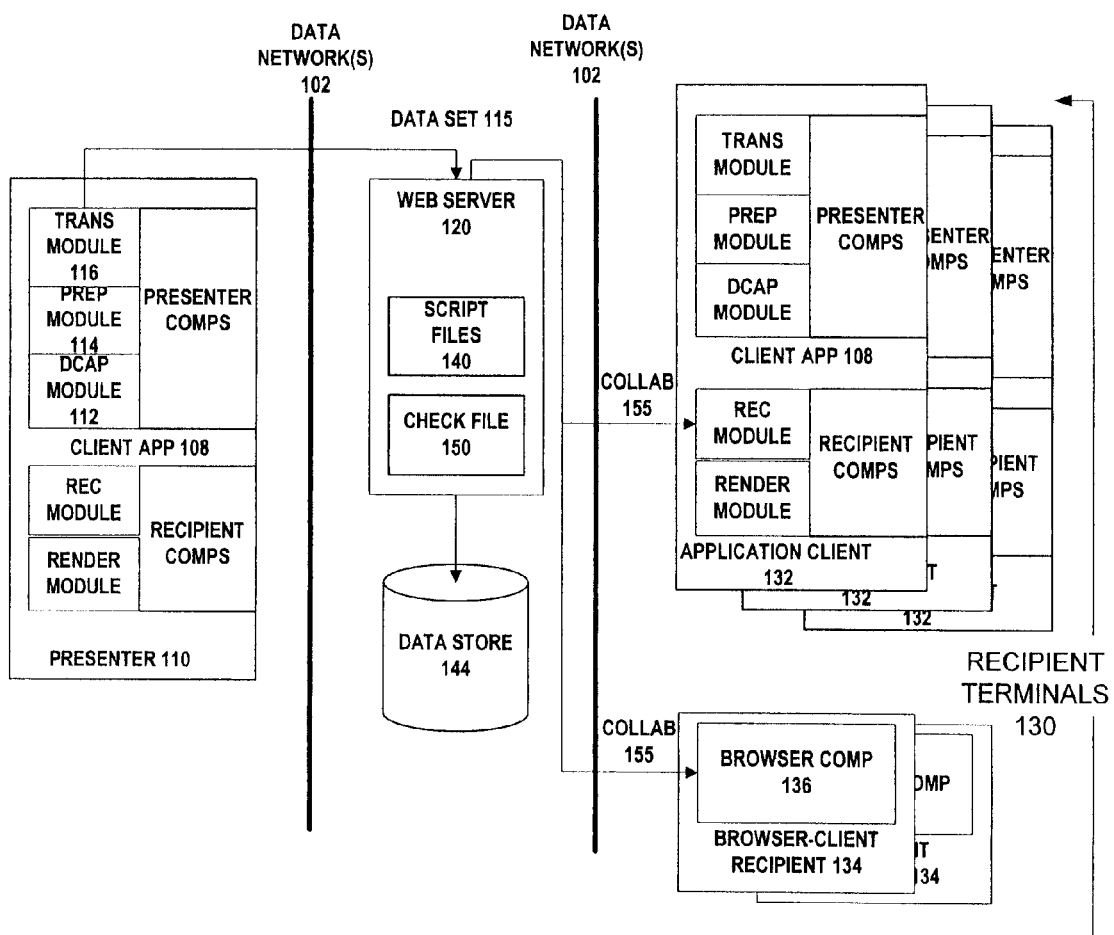
FIG. 1 illustrates an online collaboration system, according to an embodiment of the invention.

Embodiments of the invention provide an online collaboration system that utilizes a general purpose server and standard web protocols to enable participant computers to communicate with one another. One or more client applications may be used to perform most of the data handling tasks in making collaboration data available from the server using the standard web server protocols. As such, embodiments of the invention can leverage existing web hosting infrastructure and eliminate the cost of installing and operating proprietary application servers.

In an embodiment, an online collaboration session may be provided through use of multiple terminals and a general purpose server. In particular, an embodiment enables an online collaboration session to be conducted amongst multiple terminal through use of a standard web server and web protocols. As a result, real-time collaboration sessions may be conducted, using protocols such as Hypertext Transfer Protocol (HTTP) (version 1.0, 1.1 etc.) or File Transfer Protocol (FTP). Moreover, terminals participating in the online collaboration session connect with the server in order to send or retrieve collaboration data, but the server does not actively connect to the participants. Each participant terminal's connection to the server is independent of connections made by other participants, and the server does not need to connect to all the collaboration participants concurrently.

One result that may be achieved with embodiments described herein is that an online collaboration session can be established and hosted without use of any specialized server applications or processes. The online collaboration session can be scaled to include a large number of participants while being firewall friendly. Because a standard web server can be used with no specialized server-side applications, the cost for providing the online collaboration session is significantly reduced to the host and participants of the collaboration session.

Overview

According to an embodiment, data may be made available to one or more participants of an online collaboration session through use of a client system that generates or otherwise captures the data to be shared, and then formats that data for use by general-purpose server resources. In one embodiment, data from the operation of an application on the client system is captured. A formatted data set that is suitable for the client-server communications is prepared from the captured data. The formatted data set may be configured with characteristics to enable the server to respond to requests from one or more participant terminals of the online collaboration session. During the session, the formatted data set may be transmitted to the server in one or more discrete and independent communications.

In an embodiment, data is prepared on a client system so that client-server and/or server-client communications have the following properties: (i) each client-server and server-client communication is independent of any previous communication handled by either of the server or the client; and (ii) the server does not need to execute any continuous processes when transmitting the data to the participant terminals, or when receiving the prepared data from the host terminal. The preparation of the data may also provide for the communications between the server and the participant/host terminals to not be persistent. This means that a communication channel between the server and the participant/host terminals may be closed soon or just after the communication is delivered. A type of server that can be used with an embodiment such as described is a web server. A format of the data set may correspond to a HTTP or FTP format.

One or more embodiments described herein may be implemented using modules. A module may include a program, a subroutine, a portion of a program, or a software component or a hardware component capable of performing one or more stated tasks or functions. As used herein, a module can exist on a hardware component such as a server independently of other modules, or a module can be a shared element or process of other modules, programs or machines. A module may reside on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

FIG. 1 illustrates an online collaboration system, according to an embodiment of the invention. A system includes a web server 120 that interconnects multiple participant terminals across one or more data networks 102. In an example provided by FIG. 1, the participant terminals include a presenter terminal 110 and one or more recipient terminals 130. The presenter terminal 110 corresponds to a terminal that has a primary role of providing online collaboration data that is to be shared with the recipient terminals 130. The recipient terminals 130 are terminals that have the role of being recipients of the data provided by the presenter terminal 110.

Embodiments described with FIG. 1 assume a scenario in which presenter terminal 110 is also a host of the collaboration session. As the host, the presenter terminal 110 has certain administrative permissions over the web server 120 for purpose of enabling a collaboration session to happen. In one embodiment, these permissions enable the presenter terminal 110 to upload collaboration data onto the web server 120 where it can be requested by the participants of the collaboration session. As the host, the presenter terminal 110 and/or its user may create or specify a uniform resource locator (URL) that is to be used by the participants and the web server 120 to hold and transfer data used for generating collaboration content for all the participants. The presenter terminal 110 and/or its user may also generate or specify script files that are to be used by participants during the online collaboration session. As will be explained, script files bring additional functionality in how the web server 120 and/or individual recipients (particularly a browser-client recipient) act. Additionally, the presenter terminal 110 and/or its user may also create the rules and/or configurations for the collaboration session, including what type of content is to be collaborated, what content (e.g. what document) is to form the basis of the collaboration, and what record is to be maintained of the collaboration session.

The web server 120 is configured to respond to requests from participant terminals using standard web protocols such as HTTP or FTP. Similarly, the requests from the participating terminals may be through use of the same web protocol. As described below, the web server 120 may respond to requests from any of the terminals without having any knowledge about the requesting terminal. Furthermore, the web server 120 does not require the presenter terminal 110 or recipient terminals 130 to be all connected to the same process on the server concurrently. Rather, each client request is treated as a unique request and independent of other client connections.

Collaboration data shared during a given session may be created and formatted for the web server 120 by client application 108, running on the presenter terminal 110 and one or more of the recipient terminals 130. Recipient terminals 130 that include client application 108 are termed application clients 132. FIG. 1 illustrates an embodiment in which each client application 108 includes similar components to enable a particular terminal to act as either presenter or recipient, assuming the terminal has permission or capability to upload onto the server. Additionally, the client application 108 may enable the application client 132 to make edits or supplement existing collaboration data. According to an embodiment, each client application 108 includes presenter components and recipient components. The presenter components enable that terminal to capture content and other collaboration data, and to prepare and format that data so that it can be communicated using standard web protocols, and used by the web server 120. The recipient components provided by the client application 108 enable that terminal to make programmatic requests from the web server 120 for collaboration data as it is made available from the presenter terminal 110. Additionally, as described with FIGS. 8A-8G the client application 108 may provide shared, interactive user-interface for presenter and recipient. This shared user-interface may be in the form of a web page, dynamically updated by the interaction of all the participants to a given session. In contrast, the browser-client participants 134 may use a browser 136 or similar component to run and render data provided by one of the client terminals during the collaboration session.

One or more data networks 102 such as the Internet may be used to couple the web server 120 to the terminals of the participants. When an online collaboration session is initiated, individuals who are to participate in the session may use their respective terminals to access a common network address at a designated time. A specific network location, identified by a corresponding uniform resource locator (URL), may be used for transferring amongst the participant terminals. In one embodiment, the host of the collaboration session may designate the URL with the web server 120.

Once the online collaboration session is initiated, data may be transmitted by the presenter client 110 to the web server 120 at repeated instances. The transfer of data may appear to the participants as a dynamically created web page, downloaded and repeatedly updated by all of the participant terminals. This data may correspond to content data or other forms of collaboration data, such as a full or partial screen shot on the presenter terminal, a video and/or audio stream, ink data or document views. As will be described with FIG. 3, the data captured and transmitted from the presenter terminal 110 may be continuous in nature (e.g. media stream) or discrete (a single message or document). Additionally, data captured and transmitted from the presenter terminal 110 may be targeted to select participants, rather than to all participants. Thus, for example, the presenter 110 may send a single message to just one participant, without having to share that message with other participants.

According to an implementation, the presenter components of the client application include a data capture module 112, a preparation module 114, and a transmission module 116. The data capture module 112 performs operations of capturing screen shots or receiving video and/or audio data for collaboration. For example, in one embodiment, the data capture module 112 generates graphic data representing a window or screen shot of the presenter terminal 110. In another example, the data capture module 112 captures data corresponding to an instant message targeted to one of the participant terminals. Still further, the data capture module 112 may isolate, copy or otherwise direct audio or video data stored, rendered or otherwise indicated by the user of the presenter terminal 110 that is meant for sharing with the recipient terminals 130.

The preparation module 114 prepares the captured collaboration data for transport to the web server 120. The presenter client 110 may prepare the data such that communications between the host client 110 and the web server 120 are through use of a standard web protocol such as HTTP or FTP. The preparation module 114 may format captured data from a native format to a format under the web transport protocol. Additionally, the preparation module 114 may designate the URL for the data and the identifier. The identifier may be sequenced, particularly in the case when media streams or rich content is being shared amongst the terminals.

The preparation module 114 provides the transmission module 116 a formatted data set 115, suitable for transport to web server 120. The transmission module 116 transports the formatted data set 115 using, for example, HTTP 1.0 or 1.1. As part of following the web protocol, the transmission of the formatted data set 115 may include one or more discrete and independent communications. This means that the transmission module 116 and the web server 120 do not open a continuous process that lasts the duration of the collaborations session. Rather, any process to transmit or receive the formatted data set is terminated soon or immediately after transmission of that data set. When recipient terminals 130 make requests to the web server 120, the web server typically starts a new process to handle each request. The web server 120 simply handles the upload and storage of data from the formatted data set 115, as well as the retrieval of collaboration data from the formatted data set.

The formatted data set 115 may correspond to a static form of collaboration data, such as a document view or message that the user of the presenter terminal 110 intends to share with the participants. Alternatively, the formatted data set 115 may correspond to continuous data, such as provided by audio and video. For example, the formatted data set 115 may correspond to copies of segments of the audio or video data during a given interval (e.g. 1 second). Over the course of a session, the transmission module 116 may send several formatted data sets 115, or a series of data sets corresponding to continuous data (e.g. audio stream) rendered or created on the presenter terminal 110.

Whether the formatted data set 115 represents discrete or continuous data, transmission of the formatted data set to web server 120 may be in the form of one or more independent and discrete communications. Likewise, transmission of the formatted data set from the web server 120 to the recipient terminals 130 may also be in the form of discrete and independent communications. As such, web server 120 may receive, and transmit the communications (in response to requests) separately and without knowledge of other communications.

In cooperation with the operations of the participant terminals, one or more script files 140 may reside on the web server 120 to bring added functionality in how the web server 120 or participant terminals (particularly browser client terminals 134) function during a collaboration session. In one embodiment, the script files 140 are loaded by the presenter terminal 110, acting as the host. For example, the presenter terminal 110 may programmatically communicate the script file 140 to the web server 120 for use with a given online collaboration session. When needed, the web server 120 in turn communicates the script file 140 (or portions or derivatives thereof) to the recipient terminals 130. The script files 140 may perform functions that include causing each participant terminal to repeatedly check for collaboration data provided by another client terminal. On the web server 120, the script file 140 may enable the web server to discriminate against users (so that the terminal providing data can be selective as to which terminals receive the data), and to provide responses to requests from the participant terminals. For browser-client respondents, the script files 140 may be executed by browser 136 to enable the browsers of the browser-client participants 134 to have ability to participate in the collaboration session. However, the functionality of the browser 136 is limited in comparison to the client application 108.

In one embodiment, web server 120 receives the formatted data sets 115 from the presenter terminal 110 in one series of independent and discrete communications. The web server 120 stores each formatted data set 115 as a separate file, having an identifier that identifies the network location of the online collaboration session. A database 144 or other form of structured memory may be used to store the data transmissions from the presenter terminal 110. Separately, the web server 120 may communicate with the recipient terminals 130 by responding to requests from those terminals. The requests from the recipient terminals 130 may specify the URL of the network location. Each recipient terminal 130 may include intelligence, provided through programming as part of the client application on the application-client participant 132, and/or through script file 140, to request files at appropriate intervals, using identifiers that identify the network location of each individually stored file, including the sequence in which data from each file is to be assembled. As an alternative to stored files, an embodiment provides that the server 120 may store data from the data sets as database entries, or other forms of records or stored data.

In one implementation, each data set 115 corresponds to a data frame, having a sequence that relates that frame to other frames transmitted in the course of the collaboration session. Data frames representing continuous data may be segmented to represent specific intervals (e.g. one second intervals) in which the continuous data is captured. Data frames representing discrete data may be sequenced to relate the event that causes the generation of the discrete data to other events or other data transmissions (even concurrent transmission of continuous data) in the same collaboration session. The sequencing may be used by the recipient terminals 130 in requesting data from specific files that correspond to the individual data frames. This enables events and continuous data to be recreated on the recipient terminals 130 in near-real time, and in correct order. On the recipient side, the tracking of the sequencing and the programmatic requests generated therefrom may be achieved programmatically, by the client application 108 and/or scripts 140 generated from the presenter terminal 110.

In an embodiment, the web server 120 is provided with a check file application 150 that responds to requests from a given recipient terminal 130 by repeatedly checking database 134, for a set duration after the request is received, for collaboration data that the given recipient terminal 130 is to receive. One of the recipient terminals 130 may submit a request identifying, for example, a particular sequence representing the next event or data frame that recipient is to receive. The request for collaboration data from any of the participants may invoke the check file application 150, which uses the identifiers (including the sequence identification) provided in the request from the recipient terminal 130. Upon receiving a request from one of the recipient terminals, the check file application 150 repeatedly checks for the availability of that data for a set duration. In one implementation, the check file application 150 checks the file names maintained by the server for a match to the identifier provided in the request. The effect is that the recipient terminals 130 can make requests for data from the web server 120 without having to know when collaboration data from the presenter terminal 110 is ready. The recipient terminals 130 can make, for example, one request in a minute, and check file application 150 can check every second in that minute for collaboration data for the participant terminal making the request.

As an alternative, however, each participant 150 may repeatedly poll web server 120 for collaboration data. More frequent requests may reduce latency between the time that data set 115 is transmitted and when corresponding collaboration data 155 is received, at the cost of potentially degrading server performance. Thus, one benefit of implementing check file application 150 is that it reduces the need for each participant terminal to poll the web server 120 without increasing the latency of the shared data's availability.

The recipient components of the application-client participants include client participants 132 a receiving module 135 and a rendering module 138. The receiving module 135 makes requests for collaboration data (data from the files) from the web server 120 using protocols such as HTTP or FTP.

The rendering module 138 may map the collaboration data 155 to an underlying application, and/or render the collaboration data in the context of a user-interface. In one embodiment, the rendering module 138 is capable of generating and/or updating a display or playback based using the collaboration data 155 received from the web server 120. In one implementation, the rendering module 138 may map the collaboration data 155 to an underlying user-interface that renders the collaboration data 155, regardless of the file type of extension used when the collaboration data is transmitted from the server 120. In another implementation, formatted data set 115 may represent a word document, and the rendering module may apply collaboration data from that document to an underlying word processor application. In addition to rendering collaboration data, application-client participants 132 may also be equipped to supplement or edit the collaboration data 155. For example, rendering module 138 may render content originally generated on the presenter terminal 110. The user of the application-client participant 132 may render this collaboration data as a screen shot or other output, then edit or modify the content, and retransmit the screenshot of the edited content to the other participants (including the original presenter). In one implementation, the types of modifications that can be made to a document (or presentation from a document) include the inclusion of ink data, or data that supplements existing content on the document/presentation.

Browser-client participants 134 may include the browser 136. These components may simply render data that is renderable to the browser 136. One of the script files 140 may be used to provide added functionality to the browser component 136 to enable the browser components to make the appropriate requests from the web server 120.

Data Treatment and Handling

Figure 2A:
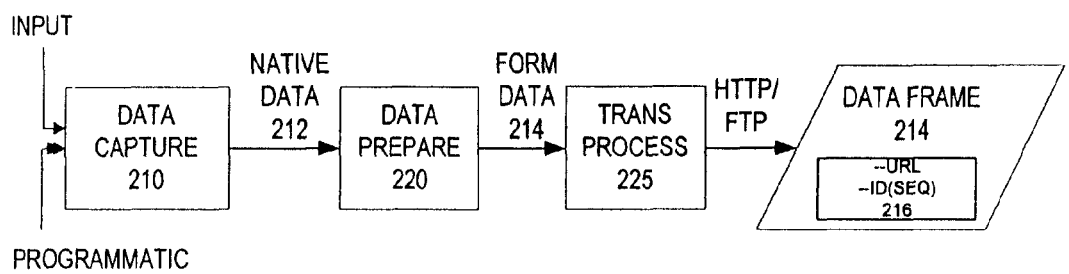
FIGS. 2A-2C illustrates different processes that transform data during an online collaboration session.
Figure 2B:
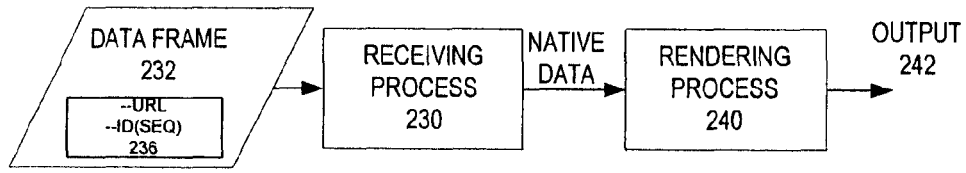
Figure 2C:
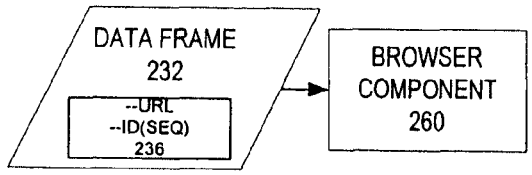

FIGS. 2A-2C illustrates different processes that transform data during an online collaboration session. In describing embodiments of FIGS. 2A-2C, reference may be made to elements of FIG. 1 for purpose of illustrating suitable or illustrative components for use with an embodiment.

In FIG. 2A, the manipulation of data during processes of data transmission from the presenter terminal 110 to the web server 120 is shown. A data capture process 210 may execute on presenter terminal 110 in order to capture content data, or other forms of collaboration data. Captured content data refers to a copy, representation, or rendition of a data item that is in use or stored on the presenter terminal 110. Examples include a screen shot of a screen or portion thereof, a document, a document view, a message (such as a text message), a copy of an image, audio or video generated by the user (e.g. the user on the presenter terminal 110 speaking into a microphone and/or camera), and an audio or video file played back on the presenter terminal (e.g. the user on the presenter terminal 110 playing a video). The capturing of the content data may be initiated programmatically and/or through user-input. For example, the user may select a user-interface feature on the presenter terminal 110 to capture his voice, or the user may simply speak and have a monitoring program detect his voice and record it for the collaboration session. As another example, the user may select each screen shot, or the software on the presenter terminal 110 may automatically capture the screen shot of the user periodically, and/or in response to a detected change in the content on the screen, or in the application executing on the presenter terminal 110.

As shown by FIG. 2A, a result of the data capture process 210 is a native format data set 212. For example, a screen shot may comprise one or more data elements having an image data type (e.g. ".bmp" ".gif" ".jpeg"). As another example, captured media may be in the form of a ".wav" or ".mpeg". Numerous other data formats associated with messages and documents may also be used. In one embodiment, the data capture process 210 monitors the presenter terminal 110 in order to capture changes on the screen of the presenter terminal as frames. Each frame may contain a full description of the screen (which is a keyframe), or alternatively contain differences from the previous frame (a difference frame).

Execution of the a data preparation process 220 results in the native format data set 212 being converted into a formatted data frame 214 suitable for transport to web server 120 using a standard web server protocol. This process may also include the data frame 214 being combined with data elements 216 that include an identifier of that data frame. The data elements 216 used to identify the data frame may also identify a network location on the network (maintained by the web server 120) where the data frame is to be stored as a file. As mentioned earlier, data frames 214 may represent continuous data, such as audio and video, or discrete data, such as a screen shot or other event driven data. Accordingly, each formatted data frame 214 may be sequenced, to represent the timing of the event or the frame in relation to other events and/or frames. The sequence of the formatted data frame 214 may be reflected in the identifier provided to that data frame through the data preparation process 220. An example of a data element that identifies the network location, the data frame, and its sequence relative to the events of the collaboration session may be in the form of a URL that includes arguments or other coding with a sequential identifier for the data frame. The URL itself may identify the network location.

Subsequent to the data preparation process 220, a transmission process 225 may be executed in which an individual data frame 214 is sent to the web server 120 using a standard web server protocol. The following pseudo-code provides an example of the transmission process 225:

```
While (session in progress) {
    Request FrameFile from CaptureFrame;
    if (FrameFile is available) {
        Send FrameFile to HTTPServer;
    }
    // add optional delay to control upload frequency
}
```

In the example provided, "CaptureFrame" may refer to data preparation process 220, and "HTTPServer" may refer to the web server 120.

FIG. 2B illustrates processes that may be performed by recipient clients 130 when collaboration data 155 is received during the collaboration session. In the example provided by FIG. 2B, collaboration data 155 may be in the form of a data frame 232, which includes data retrieved by web server 120 from a corresponding file stored at the network location. As described in FIG. 2A, the corresponding file may contain formatted data from a given instance or interval of the collaboration session. In one embodiment, the receiving process 230 may correspond to a program running on the participant's terminal that programmatically retrieves files from the web server 120. In one implementation, the receiving process 230 may poll the web server 120 directly for data frames. In another implementation, the receiving process 230 may communicate with check file application 150, which acts for the receiving process 230 by returning requested data as soon as it is present. If no data is present at the time the request is made, then the check file application 150 may communicate an error indicating when the receiving process 230 should submit another request.

As described elsewhere in this application, an embodiment may provide that each data frame 232 provided by the web server 120 during an online collaboration session is sequenced. For example, the web server 120 may include a data element 236 to identify sequence and other information to enable the recipient to handle the data in relation to other data frames received during the session. In such an implementation, the receiving process 230 makes requests that indicate the sequence, including the most recently received data frame and/or the data frame that is supposed to be received next. An error or message may communicate to the receiving process 230 that the receiving process should request a subsequent sequenced data frame 232. Such an implementation may be used to send collaboration data from a given interval to one recipient terminal 130, but not another. For example, the data frame may contain a text message for an identified recipient. The message may be sequenced, and recipient terminals 130 who are not intended recipients of that message may have their respective receiving processes instructed to request another data frame in the sequence. The following pseudo-code illustrates implementation of the receiving process 230:

```
FrameFile=last keyframe;
While (session in progress) {
    Request FrameFile from HTTPServer;
    // if GetFile is used, specify a time period for the request
    if (FrameFile is available) {
        Send FrameFile to ShowFrame;
        FrameFile=next frame;
    }
    // add optional delay to control request frequency
}
```

In the example provided, GetFile may correspond to the check file application 150, which makes requests on behalf of the requesting client for a duration lasting the specified time period. The ShowFrame may correspond to the rendering module 138 of FIG. 1.

The rendering process 240 may execute to render (via display and/or playback) data frames retrieved from the web server 120, thereby producing output 242. The rendering process 240 may perform a full update of the screen using the data frames of collaboration data 232 while discarding other data frames from previous retrieval. The collaboration data 232 may be received by the rendering module 240 in a native data format. Alternatively, collaboration data 232 may correspond to a difference data or frame, in which case the rendering process 240 may add or otherwise combine the collaboration data (e.g. add new frame to existing data frame) to existing data in order to create an updated output.

FIG. 2C illustrates processes that may be performed by browser-client participants 134, under one implementation. In one embodiment, the presenter terminal 110, or other terminal on which a client is executing, may convert the collaboration data into a data format that is supported by a web browser 260. Examples of such formats include Hypertext Markup Language (HTML), Java, or Flash. Data may be transmitted in this format to the web server 120 as a data frame or other structure supposed by the browser 260. This allows the browser-client participants 134 to rely on the browser 260 or similar application to send requests for collaboration data to the web server 120. In order to facilitate the browser-client participant 134 in making the requests, an embodiment provides that the browser 260 runs one of the script files 140 to programmatically instruct it on making requests to the web server 120. The script 140 may enable the browser 260 to make correct identification of the collaboration data 215. In one embodiment, the script 140 enables the browser 260 in identifying a current sequence for a data frame. As with the application-client participants 132, the check file application 150 may be used to reduce latency and server workload in having to respond to repeated polling requests from the browser-client participant. The same browser 260 may control the rendering of the collaboration data. Unlike application-client participants, an embodiment provides that the browser-client participants 134 cannot act as presenters, and the scope of the rendering of the collaboration data may be limited by the functionality of the browser. It is, however, possible for one of the script files 140 to increase the functionality of the browser-client terminals 134 so that the browser can act similar or as a "quasi-application-client" by enabling additional functionality, such as presentation or supplementing content capabilities.

Figure 3:
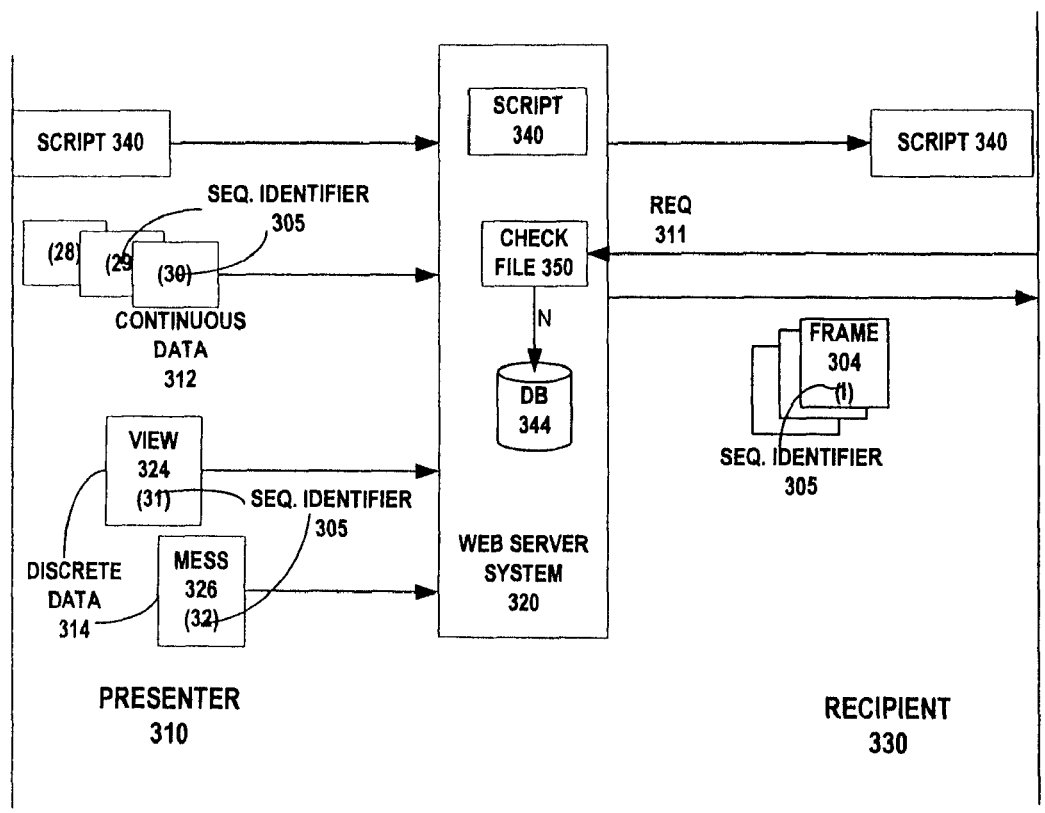
FIG. 3 illustrates the use and manipulation of different kinds of data in a collaboration system, according to an embodiment of the invention.

FIG. 3 illustrates the use and manipulation of different kinds of data in a collaboration system, according to an embodiment of the invention. FIG. 3 illustrates a presenter terminal 310 that shares data with one or more recipient terminals 330 during a collaboration session. A web server 320 communicates data between the presenter 310 and the recipient(s) 330. The web server 320 may manage a database 344.

In the example provided by FIG. 3, from presenter 310, data may be provided for use in a collaboration session that corresponds to either continuous data 312 or discrete data 314. Each type of data is illustrated as an individual data frame 304. Additionally, presenter 310 may upload a script file 340 that is used by the web server 320, and/or communicated to recipient(s) 330. Data frames 304 corresponding to continuous data 312 include data frames containing audio (e.g. user of presenter terminal 310 speaking) and/or video (e.g. video user of presenter terminal 310) in a given duration of time (e.g. one second). Examples of discrete data 314 include data frames 304 that correspond to a view 324 (e.g. a document, window, or screen shot view) or a message 326.

According to an embodiment, individual data frames 304 are sequenced. The sequencing may correspond to the order in which data contained in each frame is created on the presenter 310 during the collaboration session, and/or the order in which the data is to be rendered by the recipient(s) 330. The sequencing may be achieved with the inclusion of a sequence identifier 305, included with the data frames 304 as they are communicated to the web server 320. In the example provided by FIG. 3, the sequence identifier 305 indicates 30 data frames 304 of continuous 312 data are captured, then the view 324 is captured from the presenter 310, and then the message is transmitted from the presenter 310. To illustrate the example, the presenter 310 may speak a sentence or two which is captured (corresponds to continuous data 312 for the first 30 frames). While he is speaking, he may create or modify his display or user-interface presentation to reflect what he is saying. Subsequent to his speaking, the screen may be captured as view 324 and provided the sequence identifier 305 that follows the data frames of his speech. Sometime after speaking and modifying his screen, he may transmit the message 326 to one or more of the recipient(s) 330.

The web server 320 receives each data frame 304, and stores the data frames at a network location (e.g. on database 344) that is identified by a designated URL of the collaboration session. In one embodiment, each frame 204 may be stored as an individual file having a file name that corresponds to that data frame's sequence identifier 305. The files are each stored at the location of the URL. Additionally, web server 320 may distribute the script files 340 to the recipients 330.

In one embodiment, each recipient 330 who makes a request for collaboration data makes a request 311 to script 340, operating on the web server 320. This script 340 may be loaded onto the server 320 by the presenter 310 (acting as the host) at some point, before or during the session. Each request 311 may identify the requestor and the sequence identifier 305 that the recipient is expecting. Initially, the first request from any recipient 330 may be an initial sequence identifier (e.g. 0). However, the script 340 running on the server 320 may communicate to the recipients what the correct sequence number at a given instance is. In response to receiving each request 311, the script 340 can accept or reject the request, depending on the circumstance. In the case where no data is yet available (because presenter 310 has done nothing in a duration), then the request may be denied, or provided an error message. This response may be interpreted by the recipient 330 as requiring the same request (specifying the same sequence identifier 305) to be remade.

Alternatively, the script 340 may instruct the recipient to move onto the next sequence identifier. This case may correspond to the situation where the presenter 310 wishes to make a particular data frame (e.g. message 326) available to one of a plurality of recipients 330, but not the others. The script 340 uses the recipient's identifier to respond positively to the recipient that is the intended recipient of the given data frame, and rejects all other requests with instructions to have rejected recipients move on to the next sequence identifier.

The following describes how frames 304 may be targeted to one recipient over another. In one embodiment, each recipient 330 may make a request for an event that the client is intending to make available to just one recipient having user identification "7". This request may be generated programmatically, using the client application 308, or in the case of the browser-client recipient 134, running another script through that user's browser.

The url for such a request may look like: http://www.mywebsite.com/getevent?eventid=5&clientid=11

The "getevent" url points to the script file 340 running on the server (using PHP, JSP, ASP, or any other web server script language). The "eventid" is the sequence identifier of the message requests by a participant whose client identifier is 11. The script 340, which has been coded by the presenter to only deliver message "5" to client "7", will reject the request and returns an error message. The recipient 330 having identifier "11" will proceed to request the next event (having sequence identifier "6"). Programmatically, that recipient knows that the event "5" was not for that terminal. The script 340 can be generated and uploaded by the presenter on-the-fly during a session.

It is not necessary for the recipient 330 to identify itself, as the server script 340 can use the recipient's client request IP address to identify the recipient and avoid the situation of an imposter or other recipient with incorrect or false identity. Additionally, the presenter 310 may know who is in the session because all the participants have uploaded its identity file to the server when they join the session.

With any event in which continuous or discrete data 312, 314 is generated, the presenter 310 may upload an event and its content to the server 320 as a file with a corresponding sequence specific identifier. The presenter 310 may also upload the script file 340 which has instructions about who can receive the event. Each recipient may make requests using the identifier via the script file. What is returned is the data frame 304 corresponding to the file for the event of the request. In the case where the recipient 330 is executing client application 108, the returned data frame 304 is parsed and rendered, using underlying applications and/or a user-interface. For example, the returned data frame could correspond to an Instant Message, an audio clip, a screen sharing frame, a whiteboard drawing event, a PowerPoint slide, etc. The recipient 330 then proceeds to request the next event file and so on.

In one embodiment, the check file application 350 may come into play to facilitate the recipient's requests. Since the recipient does not know when the next event may occur, the check file application 350 may run on the server to make multiple checks for a given event file in response to an individual request from the recipient. In the example provided by FIG. 3, the check file application 350 makes "n" checks in response to the request 311. The response 313 includes the result of between 1-n checks made by the check file application 350. As such, the check file application reduces the frequency of the number of requests 311 made by each recipient 330.

As shown by FIG. 3, the server 320 has no knowledge of how to connect or distinguish one recipient or another. However, the server is equipped with script file 340 to enable the server to perform acts of accepting and rejecting requests.

Methodology

Figure 4:
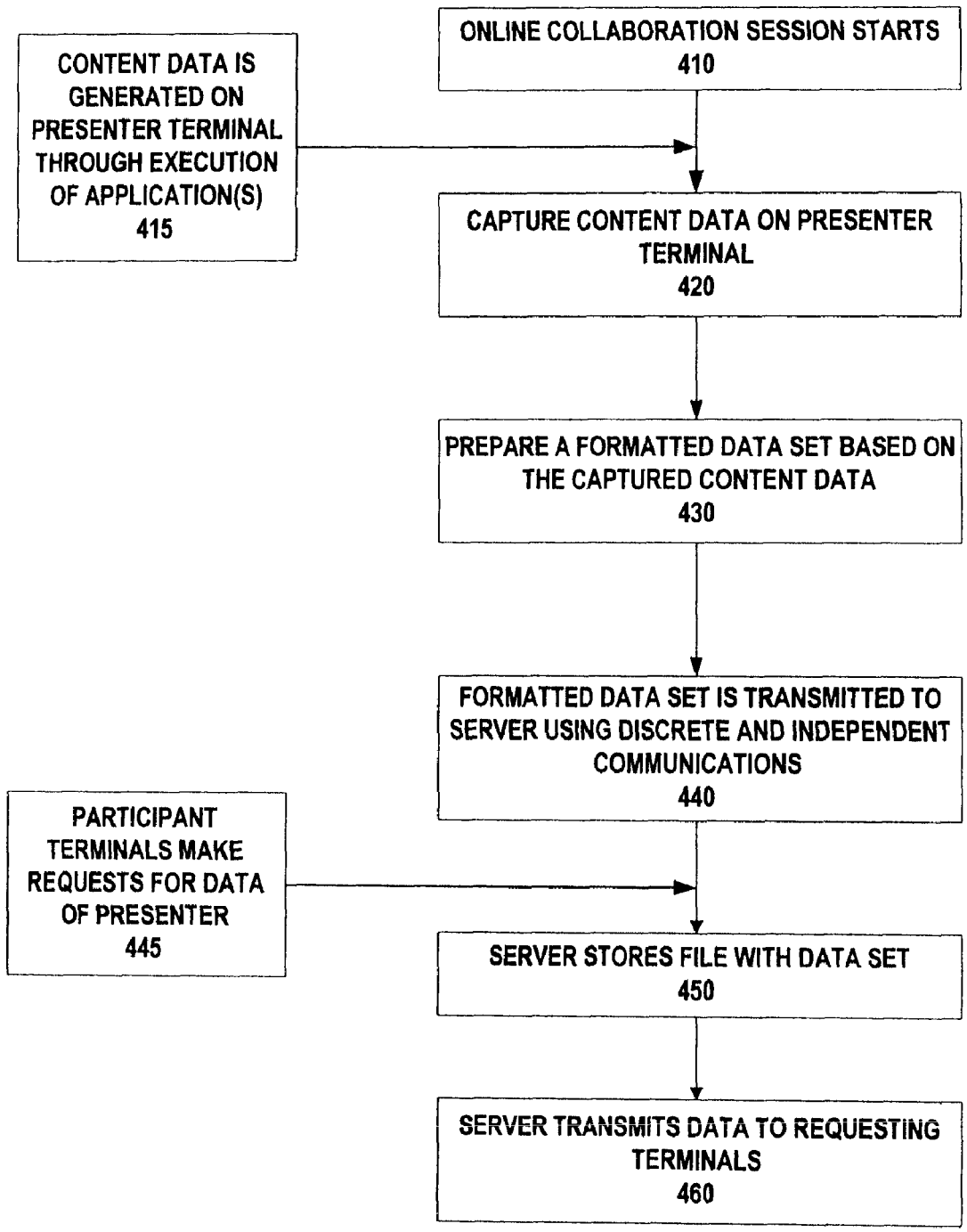
FIG. 4 illustrates a method for establishing and conducting an online collaboration session, according to an embodiment of the invention.

FIG. 4 illustrates a method for establishing and conducting an online collaboration session, according to an embodiment of the invention. Reference is made to elements of FIG. 1 to illustrate suitable elements for performing an embodiment such as described by FIG. 4.

In step 410, an online collaboration session is initiated through the action of its participants, including of the host (assumed to be the presenter). In one implementation, the presenter may specify the URL that is to be used by both the web server 120 and the recipient terminals 130. The presenter may also invite the participants. When one or more participants are present, the session may be initiated.

Step 415 provides that content data for use with the collaboration session is generated on the presenter terminal 110. In one implementation, the content may be generated through execution of native applications, including media capturing applications or content generating applications (e.g. MICROSOFT WORD or POWERPOINT, manufactured by the MICROSOFT CORP.). The capturing of the content data may result in data having a native format.

Step 420 provides that the content data is captured from the presenter. In one embodiment, an application or process residing on the presenter's terminal, such as the data capture module 112, captures the content. In another embodiment, the component that captures the content data may reside off of the presenter's terminal.

In step 430, a formatted data set is prepared based on the captured content data. The formatted data set may provide that the data is formatted so that it can be communicated using HTTP, FTP or other variations on web server protocols. The formatted data set may also be packaged with a URL and/or other identifiers that identify that data set. In one embodiment, the sequence of the data set may also be identified, including when a collaboration event occurred in relation that is represented by the data set in relation to when other collaboration events occur.

In step 440, the presenter transmits the formatted data set to the server 120. As described with other embodiments, the formatted data set may be transmitted to the server 120 as data frames, using protocols such as HTTP 1.0, HTTP 1.1, or FTP, or variations thereof. As part of the protocol, the communication from the presenter to the server 120 is in the form of one or more discrete communications (e.g. data frames). Furthermore, each of the communications is independent of any other communication from the presenter (or any other terminal) to that server 120.

In step 450, the server stores the formatted data set. In one embodiment, each data set received by the server may be stored as a separate file at the designated URL. In an embodiment in which the data files are sequenced, the files used by the server may also used sequenced identifiers. The server may receive each data set through a communication that is discrete and independent of other communications that server handles. For example, the server may be web-based and use HTTP or FTP to handle communications with all terminals that send or request data from it.

Step 455 provides that participant terminals make requests for the collaboration data provided by the presenter. All requests may also be made as discrete and independent communications, through HTTP or FTP. The request may specify a particular file or data set using the identifier or sequence information. Intelligence on the participant terminal, whether carried in a client application, script file, or other programmatic means, ensures that each request from the participant terminal is timely made, and for the correctly sequenced file.

In response to receiving such requests, step 460 provides that the server transmits data from the stored data files based to the requesting terminal. In one embodiment, the server only responds to requests. Since the participant terminals specify which file is needed in each request (using sequencing, for example), the server simply returns the file identified in the request. As with the communications from the presenter to the server 120, the server communications to the recipients are also performed using web protocols such as HTTP. As such, communications from the server 120 (e.g. data frames) may also be in the form of discrete communications that are independent of other communications received or transmitted by the server 120.

In one embodiment, as a result of performing a method such as described in FIG. 4, the presenter terminal 110 and the recipient terminals 330 all view a web page that is synchronized and updated continuously. In order to accomplish this, the presenter terminal 110 may, concurrently with providing the data used in the collaboration session, make requests as a recipient. Thus, the presenter terminal 110 can display the web page as it appears on the recipient terminals 330.

Presenter Methodology

Figure 5:
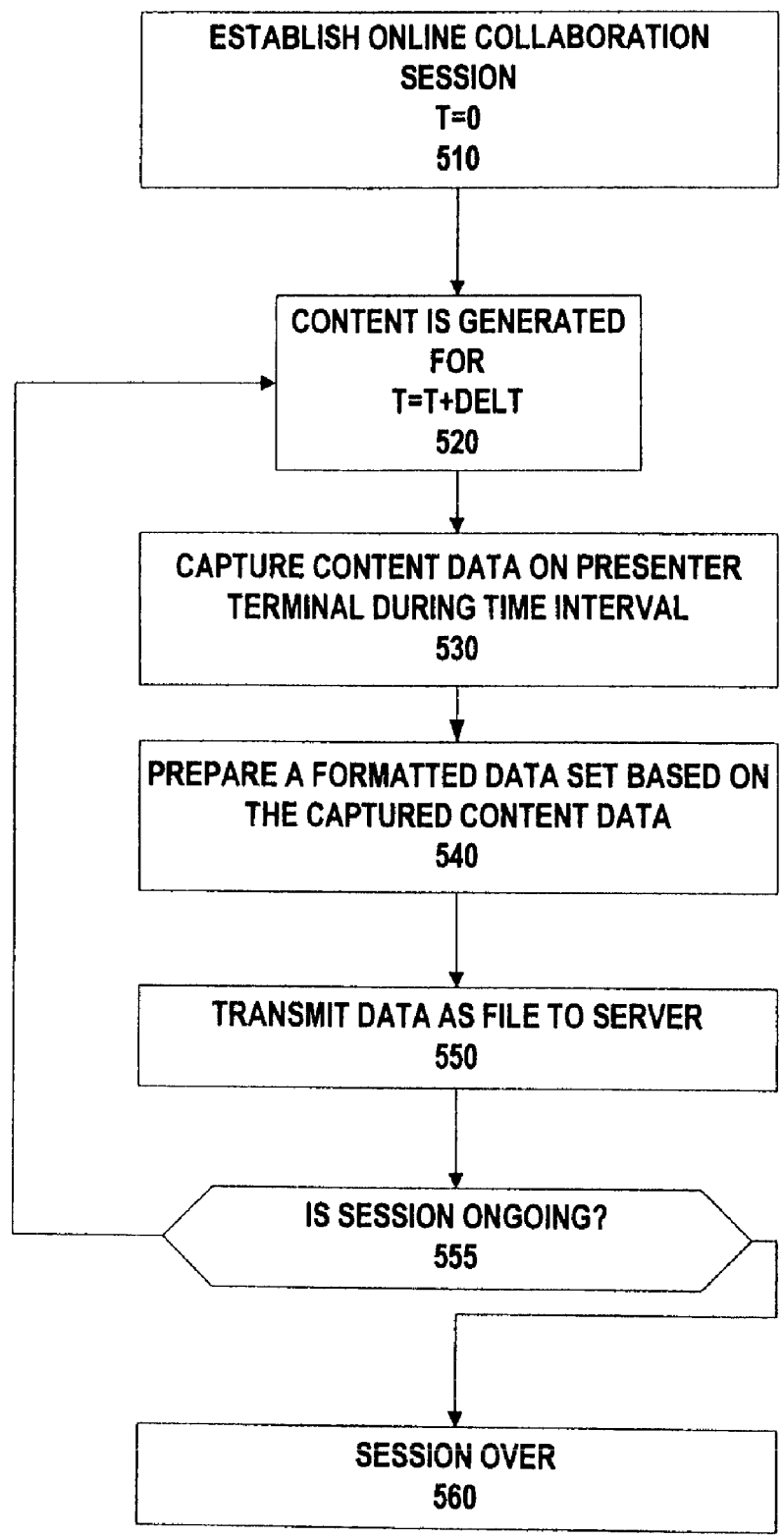
FIG. 5 illustrates a method for conducting an online collaboration session as a host and presenter, according to an embodiment of the invention.

FIG. 5 illustrates a method for conducting an online collaboration session as a host and presenter, according to an embodiment of the invention. In one embodiment, there is only one host and one or more presenters, designated by the host, in a collaboration session. Initially, the host is also the presenter of the session.

Reference may be made to elements of FIG. 1 for purpose of illustrating suitable components for implementing a step of a method described.

In step 510, the host may perform specific tasks or operations for establishing the online collaboration session. This may include, for example, inviting the participants, designating the URL on the server from which data is to be transferred to participants, and creating passwords and permissions for each participant. The host may also create the URL of the collaboration session for the web server 120. The online collaboration session may be assumed to initiate at T=0.

Step 520 provides that a given time interval passes prior to a data capture action being completed. The interval may correspond to, for example, a second or a minute or some other measurement of time. Alternatively, the time passed may correspond to the occurrence of an event, such as a user input, or a user direction to transmit some data item for use in the collaboration session. As another example, the event may correspond to a change in the screen display of the presenter, or the presenter speaking and causing audio data to be captured.

Step 530 provides that content data is captured on the presenter's terminal representing the duration of the given interval. Thus, for example, data generated may correspond to a change in the presenter's screen, or the audio generated in the given interval.

Step 540 provides that a formatted data set is created based on the captured content data. As mentioned, this data set may be formatted so that it is in a web server protocol. Additionally, as described with FIG. 3 and other embodiments described herein, the preparation of the data may indicate the sequence corresponding to the given interval of time. This sequence may also represent the order of the formatted data set in relation to other formatted data sets. As an example, a data frame may be generated representing some action or interval in which content data is captured on the presenter terminal 110. This content data may be formatted for transmission to the web server 120 in HTTP or other web protocols. As additionally, the content data may be segmented into sequenced data frames, having sequence-specific identifiers as well as identifiers to the server location (e.g. URL) in which the data is to be stored.

In step 550, the formatted data set is transmitted to a web server 120 using the web protocol. The protocol format enables the web server 120 to store the data as a file or a database entry for use by requesting participants. In one embodiment, the identifiers used with each data frame are the basis of file names and/or related metadata that are used by the server 120 and the recipient terminals 130 as identifiers.

In step 555, a determination is made as to whether the session is ongoing. For example, the determination may correspond to the host's indicating the end of the collaboration session. If the determination in step 555 is that the session is ongoing, the method returns to step 520, where a new iteration in the time interval is made. Otherwise, step 560 provides that the session is over.

Server Methodology

Figure 6:
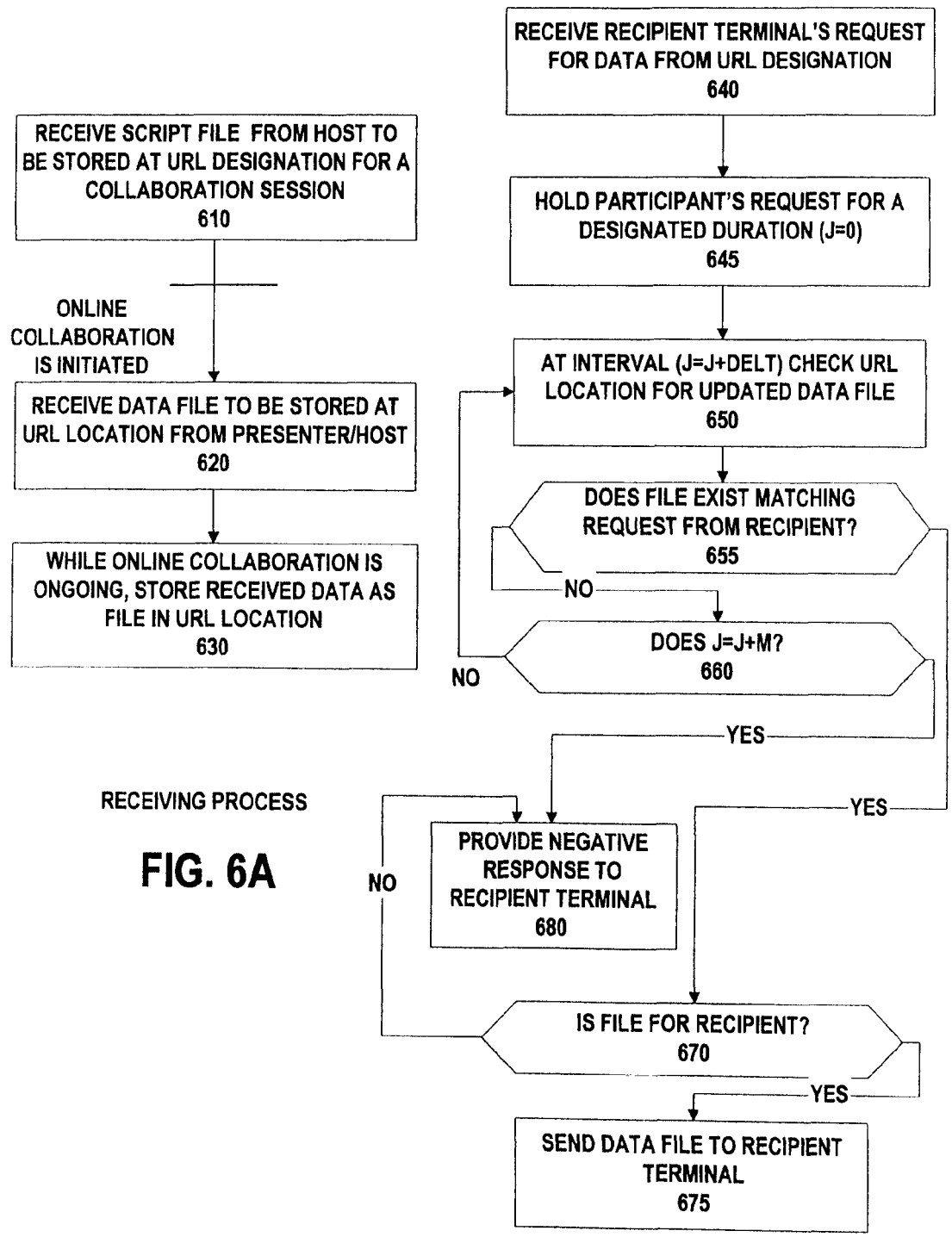
FIGS. 6A and 6B illustrate independent processes in which a server receives and transmits data for a collaboration session, under an embodiment of the invention.

FIGS. 6A and 6B illustrate independent processes in which a server receives and transmits data for a collaboration session, under an embodiment of the invention. Reference may be made to elements described in FIG. 1 for purpose of illustrating a suitable element for performing a step of a method such as described.

In FIG. 6A, a receiving process is illustrated in which the web server 120 may receive data frames from the presenter terminal 110. In step 610, the web server 120 receives one or more script files to be stored at a URL designation on the server that will be used for the collaboration session. In one embodiment, the URL designation may be specified by the host. 610. The script files may alternatively identify the online collaboration session that is to be conducted from that URL (for example, the script file may be identified for a session starting at a particular time). In step 610, all data received by the web server may be through standard protocols, requiring no specialized processes or applications to be executed by the web server 120.

Sometime after the URL is designated, the online collaboration may be initiated. In step 620, data is received during the online collaboration session from the presenter terminal 110.

Subsequently, in step 630, this data is stored in a file on a database or other structured memory available to the server. The file name or identifier may have correspondence to the identifiers included in the received data set.

In FIG. 6B, a transmission process is illustrated in which the web server 120 transmits collaboration data to the recipient terminals 130 using an optional check file application 150, according to one embodiment.

In step 640, the web server 120 receives a request from a given one of the recipient terminals 130. The request may be made through a standard web server protocol, such as HTTP. The request may identify the URL, and provide sufficient identifier for the web server 120 to identify the corresponding file being requested. For example, the identifier in the request from the recipient terminal 130 may identify the data file based on a sequence, and the web server 120 may use the sequence identifier to locate the correct data file from the database.

In step 645, the request from the given recipient terminal 130 may be held for a duration of time. This interval may correspond to a duration M.

In step 650, the check file application 150 checks the file system of the web server 120 at set intervals in the duration M for a file matching the request form the recipient terminal 130. At a particular interval during the duration M, step 655 provides that a determination is made as to whether a file matching the recipient terminal's request exists on the server 120. The check file application 150 may check data store 144 for the existence of the file. If such a file exists at that interval, then the method proceeds to step 670. Step 670 provides that a determination is made as to whether the file is for the particular requestor, or if that has been coded to send to a specific recipient that is not the requestor. An example of when this situation may arise is provided in the case of when the presenter sends one of the participants a private instant message (which may be sent as a sequenced event). If the determination in step 670 is positive, then step 675 provides that a positive response is provided to the recipient and data from the data file is transmitted to the recipient terminal 130. If the determination in step 675 is that the file exists but it is not for the requestor, then the method proceeds to step 680, where a negative response is provided. In one embodiment, the negative response to this scenario is an error message that causes the recipient terminal making the request to iterate its sequence identifier to the next number. Alternatively, the error message may simply inform the recipient terminal that the request could not be made.

If the determination in step 655 is that no file exists that matches the recipient terminal's request at that interval, then the method proceeds to step 660. The determination in step 660 is whether the duration M is over. If the duration M is over (as defined by the set intervals in which check file 150 performs the checking operation), then the method proceeds to step 680, where a negative response is provided to the user. In the case where the no file yet exists, an error or other message is returned to the recipient terminal 130 making the request. Otherwise, if the duration M is not yet over, the method returns to step 650.

Figure 7:
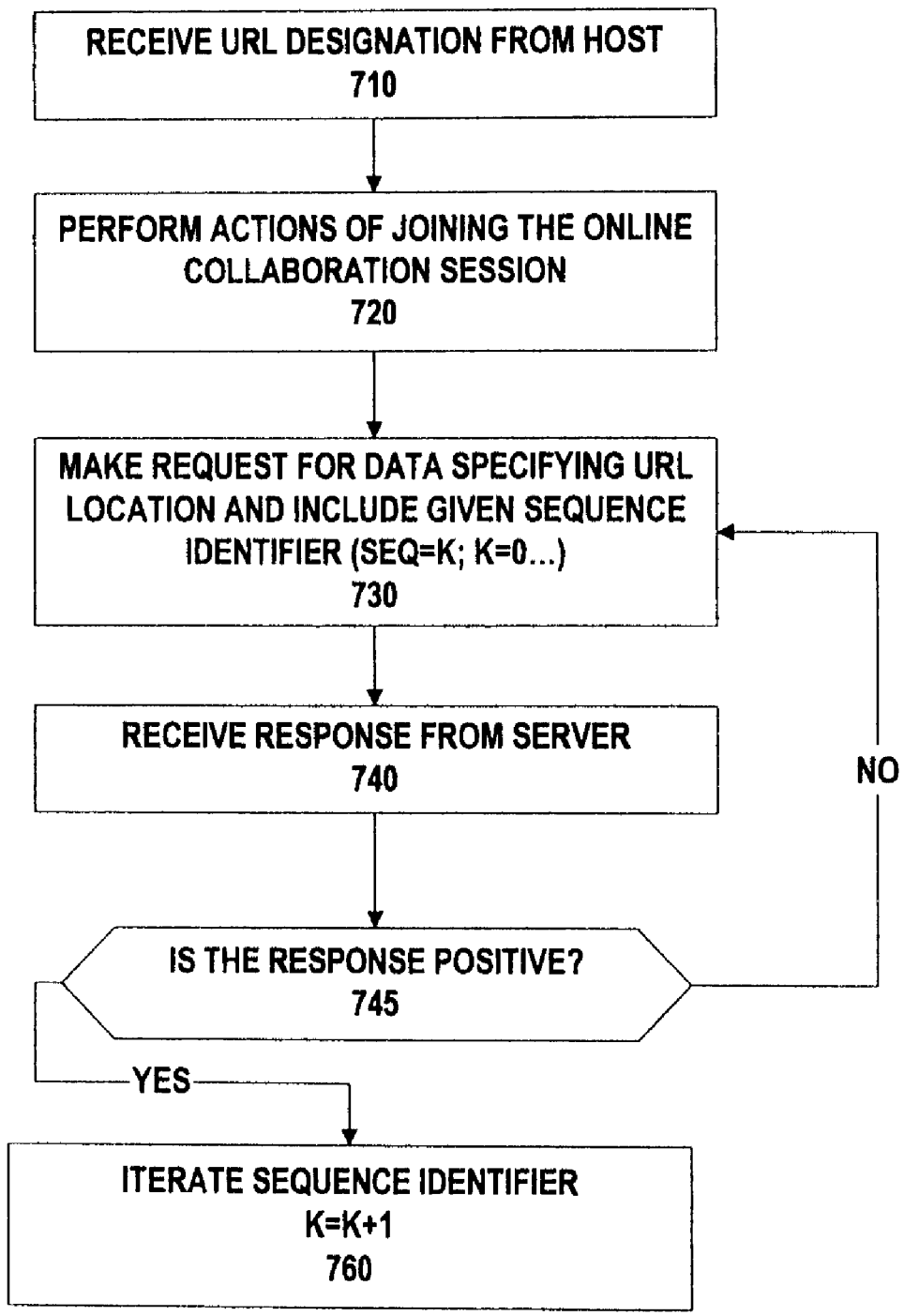
FIG. 7 illustrates a method in which a user can participate in an online collaboration session as a participant, according to an embodiment of the invention.

FIG. 7 illustrates a method in which a user can participate in an online collaboration session as a participant, according to an embodiment of the invention. Reference may be made to elements of FIG. 1 to illustrate suitable elements for implementing a step of a method such as described. For purpose of description, a method of FIG. 7 is described with the assumption that a user is operating one of the application clients 132.

In step 710, the client participant 132 receives an invitation from the presenter or host of the online session. This may include a URL designation, a time, and/or password information.

Step 720, the user takes the necessary steps to join the online collaboration session. This may correspond to the user logging onto the web site on which collaboration data is being hosted. The user may also include other identification information, such as the address of the network connection used to contact the server 120.

Once the online collaboration session is initiated, step 730 provides that the recipient terminal 130 makes programmatic requests for collaboration data from the web server 120. Each request includes an identification of the collaboration data being requested. The identification includes the URL and an identifier to a particular file. This identifier may include the sequence identifier, which may have an initial value (e.g. k=0). Collaboration data may be made available as the presenter terminal 110 upload files at repeated instances onto the web server 120. Alternatively, as described with FIG. 6B, the check file application 150 may be used to make repeated checks on behalf the recipient terminal's request.

In step 740, a response from the web server 120 may be received by the recipient terminal 130 making the request. Step 745 provides that a determination is made as to whether the response is positive. The response from web server 120 is positive, if it contains collaboration data satisfying the request. In one embodiment, the positive response is accompanied by data matching the recipient's request when (i) a file or a database entry resides on the server 120 which includes identifiers matching the sequence identifier of the recipient terminal 130, and (ii) the presenter terminal 110 (or the host) as not provided any script file or other programmatic mechanism to preclude the requesting terminal from receiving data from that particular file or database entry.

Once data is received, step 760 is performed. This step iterates the sequence identifier used in making the next request from that terminal.

If the response is negative, meaning server 120—cannot locate the data matching the recipient's request, then the method returns to step 730, where the request is made again, using the same sequence identifier.

According to an embodiment, once data frames and other forms of collaboration data are received from the server 120, the data may be mapped to an underlying application and rendered on the recipient terminal 130. This may include rendering a screen shot on the participant terminal's display which corresponds to content that appears on the presenter terminal 110. Other examples include playing back audio and/or video data using an underlying media player, or opening and/or updating a document (e.g. WORD or POWERPOINT). As described in FIGS. 8A-8G, the collaboration data may be rendered through a user-interface that is in the form of a web page. The result is that each recipient terminal 130 (as well as the presenter terminal 110) may view a web page having shared content, that is updated in a synchronized fashion for all participants of the collaboration session.

User-Interface and Usage Examples

Figure 8A:
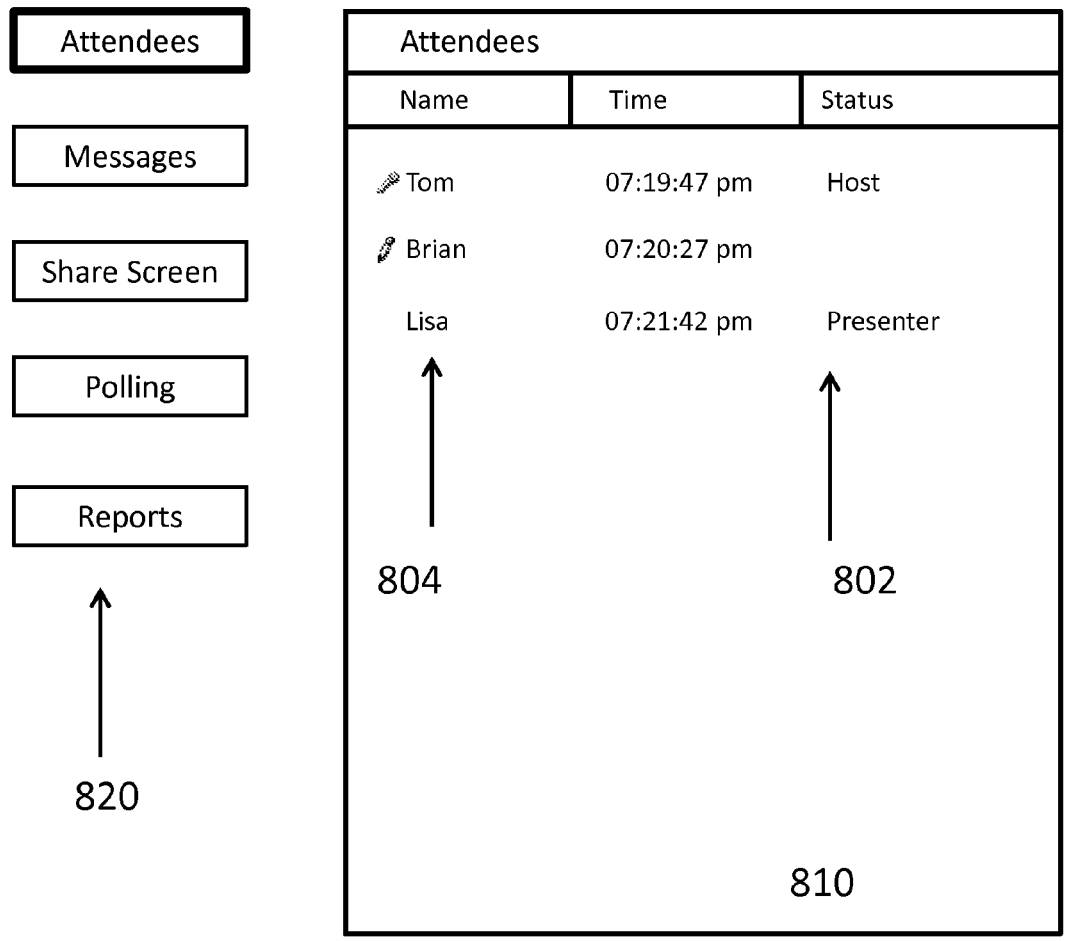

FIGS. 8A-8G illustrate sample displays generated from a user-interface of client application 108, under an embodiment of the invention. FIG. 8A illustrates an attendee screen 810 that participants of on online collaboration session can select to view through a tab or other selectable user-interface feature. On this screen, each attendee, whether presenter, host or recipient, is listed. One or more iconic representations 802, 804 may indicate the status of each participant, as well as the capabilities of that participant. The status may correspond to one of presenter, host, or recipient. The presenter is someone who will be the source of the collaboration content. The host is the entity who can upload script files and designate the URL from which the online collaboration session is to be conducted from. The recipients are those that have the primary role of receiving collaboration data. But, as indicated in FIG. 8A, recipients may also provide some types of collaboration data. In FIG. 8A, for example, recipient named "Brian" has ink writing abilities. As another example, some or all recipients may message other participants individually or the group as a whole.

Other information that may be provided on the attendee screen 810 include the time at which each participant logged on and joined the session. The perspective of the attendee in FIG. 8A is that of the host, who can also elect to capture audio video and share it with the participants through selection of an audio feature 804.

Included with each screen is a menu 820 of functions and screens for use with the session. In one embodiment, the menu 820 may be provided to the host who can control the online collaboration session and what is viewed by all participants. This capability may alternatively be shared with the presenter. It is also possible for each recipient to select from the menu in order to select what content that recipient will view at a given instance.

Figure 8B:
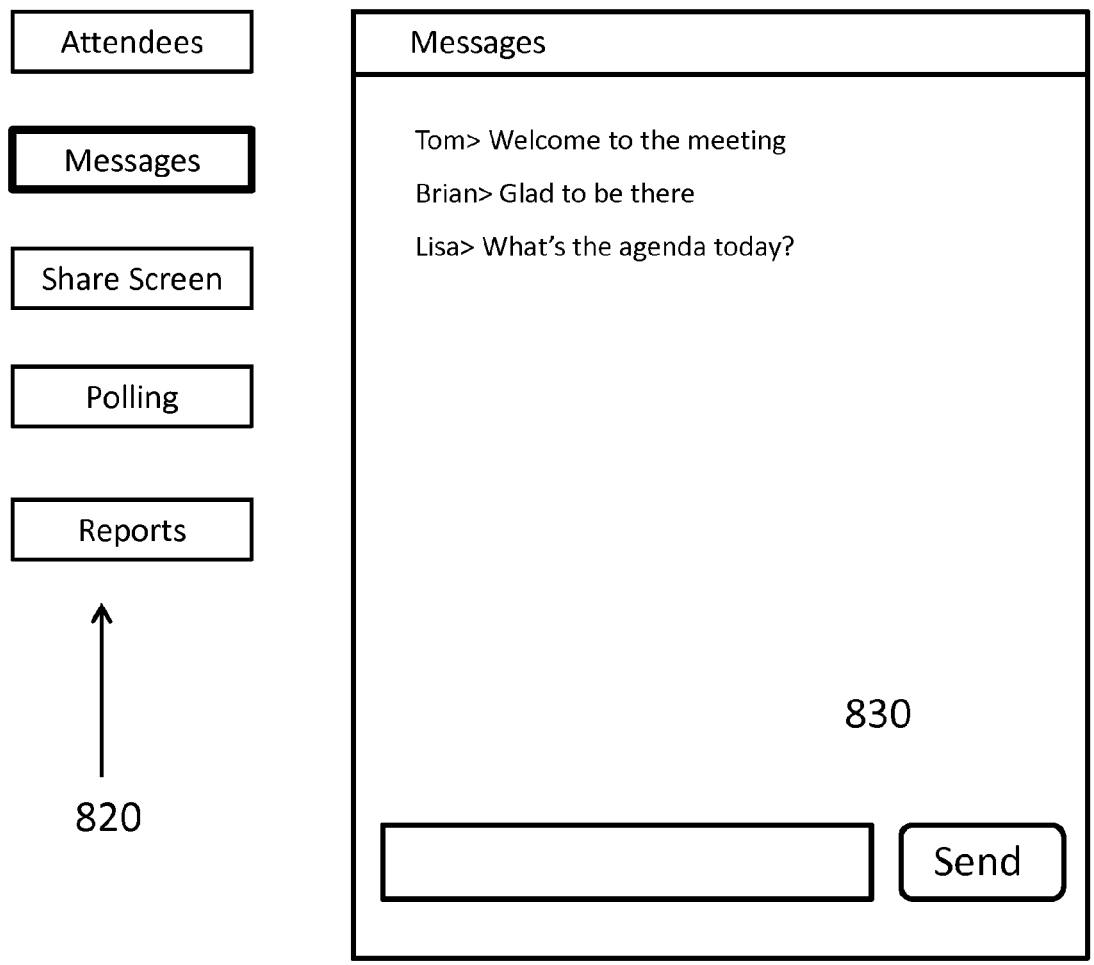

With reference to FIG. 8B, a messaging screen 830 is provided where group messages may be posted by all participants of the online collaboration session. The messaging screen 830 may be enabled when the host uploads a messaging script file onto the server.

Figure 8C:
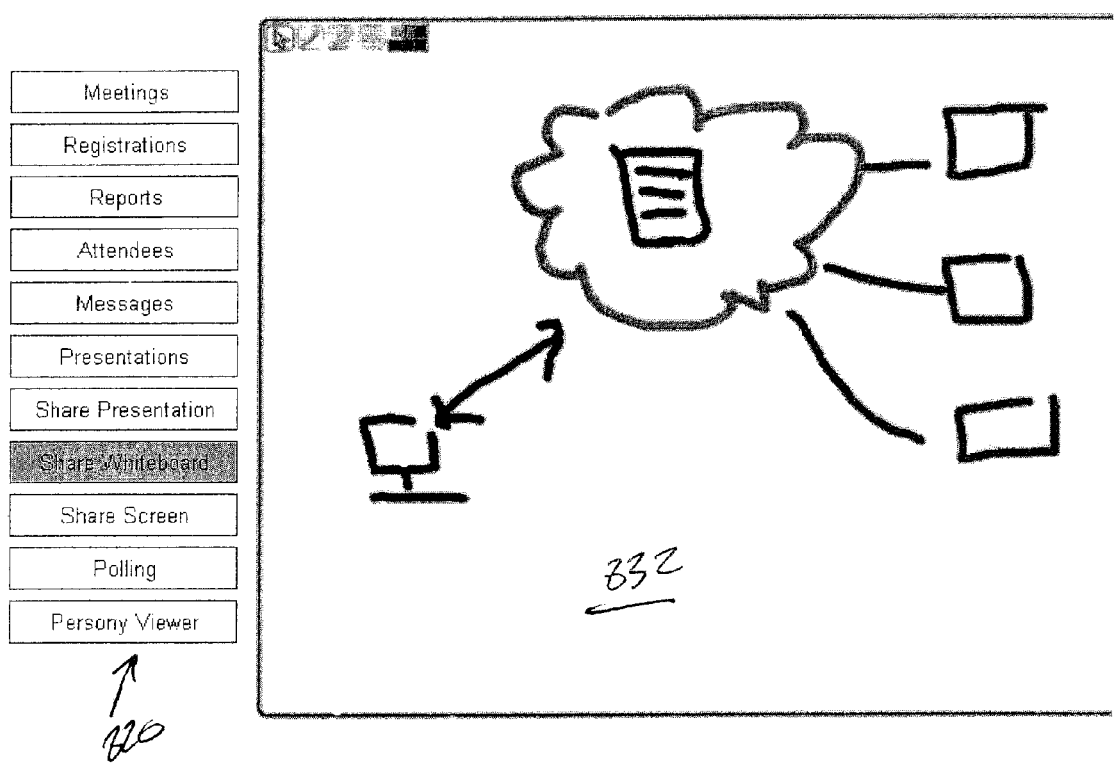

FIG. 8C illustrates one example of shared content for an online collaboration session. The content may correspond to whiteboard presentation 832, generated by the presenter. The host or presenter may select a whiteboard action from the menu 820 in order to provide this content to the recipients.

Figure 8D:
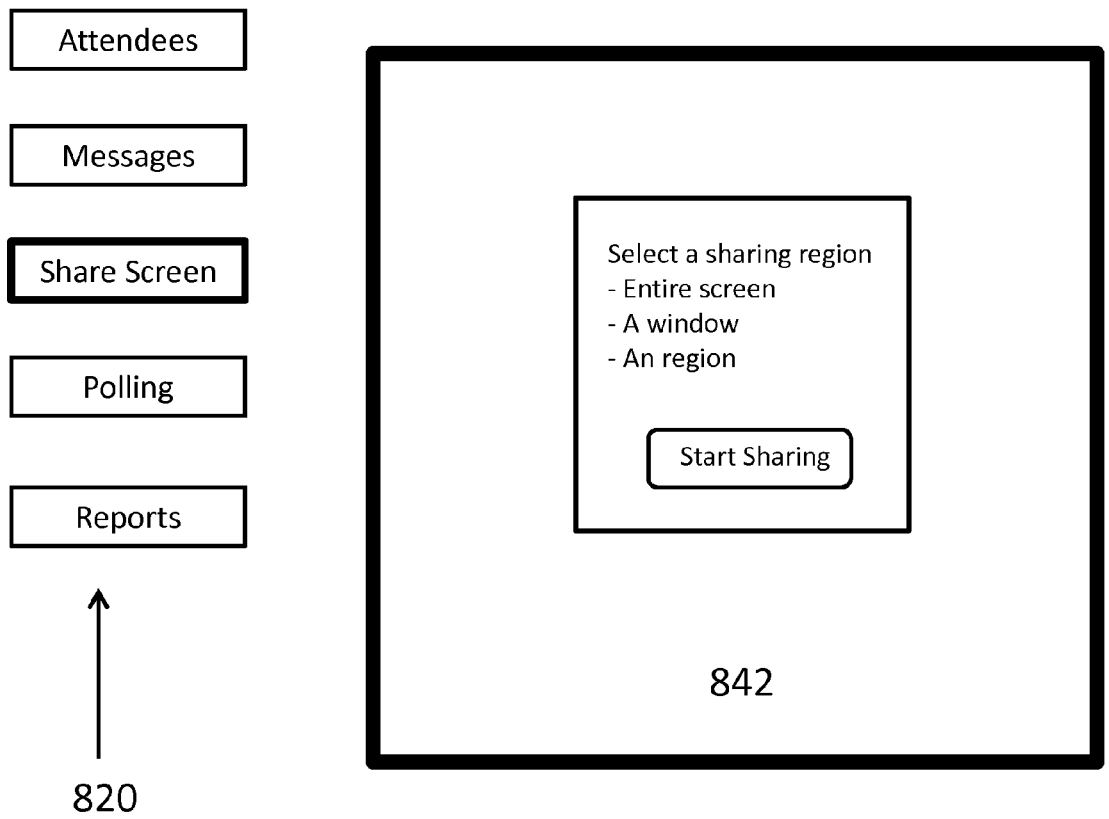

FIG. 8D illustrates another example of shared content for an online collaboration session. The content may correspond to a screen share presentation 842. The presenter or host may elect to share the presenter's entire screen, an active window, or portions thereof with all participants of the collaboration session.

Figure 8E:
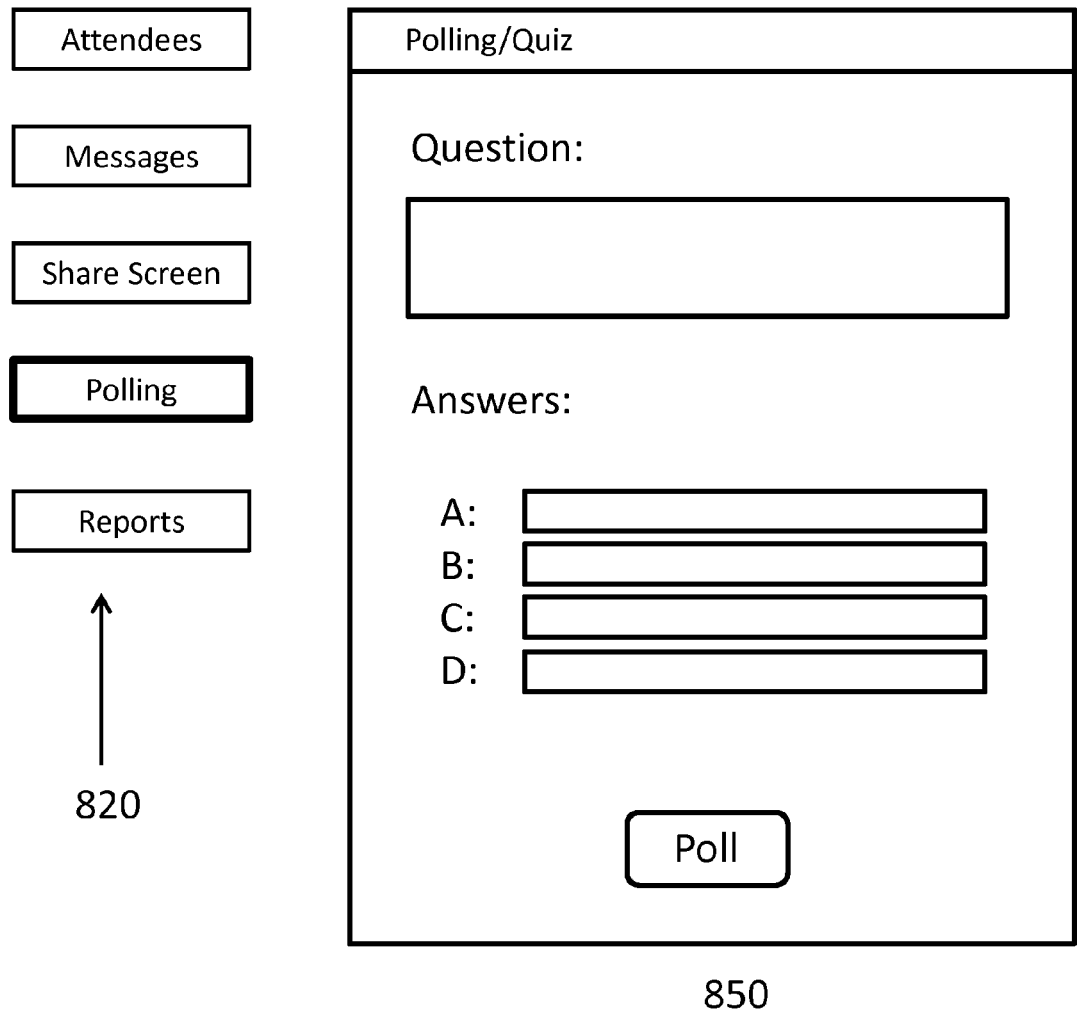

FIG. 8E illustrates yet another example of shared content for the online collaboration session. The host or presenter may generate a poll 850 that each participant can interact with in providing a response. The values provided may be tabulated and displayed, either to the host, presenter or to all parties.

FIG. 8F illustrates instant messages 860 selectively shared between the host and the various participants of the online collaboration session. As described with an embodiment of FIG. 3 and elsewhere in this application, instant messaging is an example of content that may be shared with one participant, but not another.

Figure 8G:
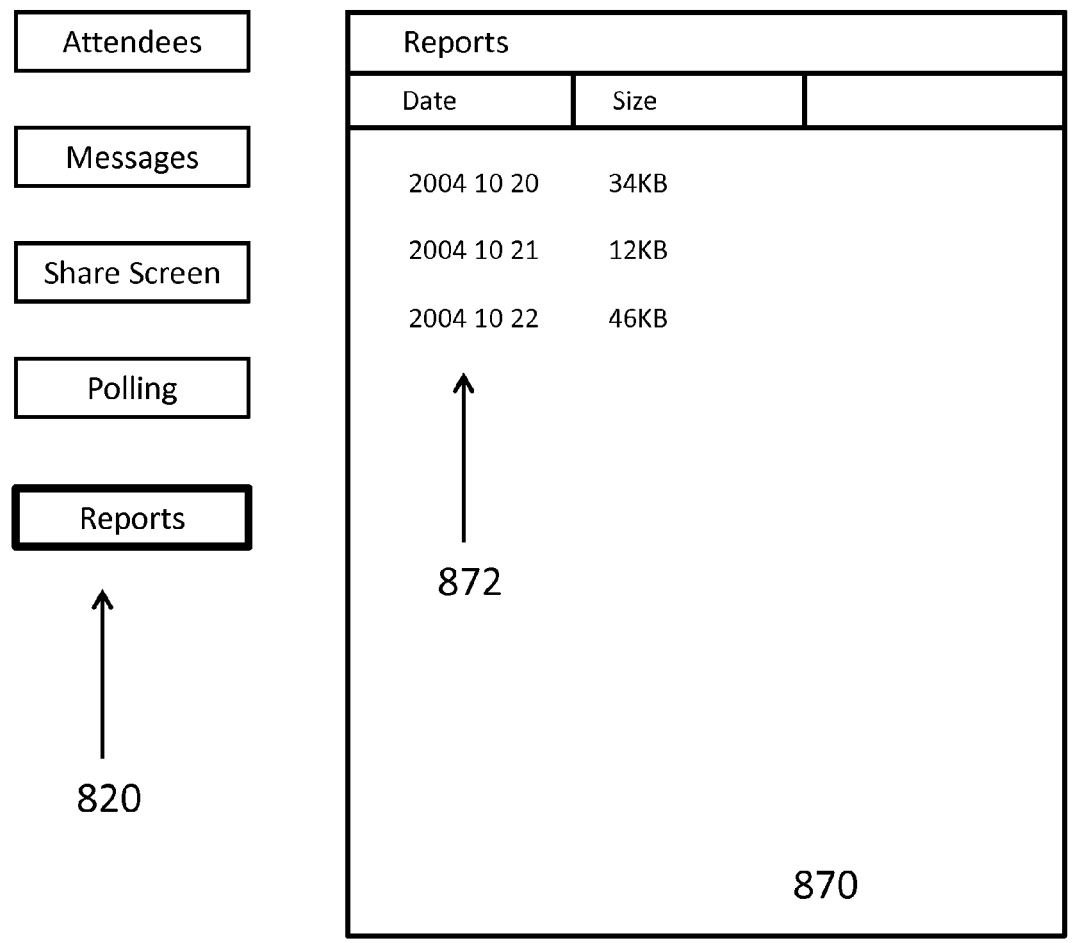

FIG. 8G illustrates a screen 870 providing a history listing of files 872 containing past online collaboration sessions. All screen shots, and messages directed to or from the host, may be stored and accessed for future use. In one implementation, the history may be made available to the host.

ALTERNATIVE EMBODIMENTS

An embodiment may utilize more than one web server in order to provide connectivity between clients of a collaboration session. In one embodiment, multiple web servers may be employed using a web server mirroring technique. Web server mirroring refers to a system in which the contents of a first web server are copied and made available on a second web server. Mirroring in this manner allows content accesses to be spread across multiple web servers and increases the scalability and reliability of web servers. Mirroring typically takes a snapshot of a web site and only works for static contents.

One or more embodiments may employ real-time mirroring to improve its reliability and scalability. Since collaboration contents change frequently during a collaboration session, real-time mirroring copies any changed contents from the original web site to a mirrored web site instantly. The original web server keeps track of a list of mirror web servers. When the content of the original server is changed, the server notifies the mirror servers about the changes using HTTP or FTP protocols. The mirror server requests a copy of the changes from the original server and uses it to update its local contents.

Participants of the online collaboration session may be instructed to connect to either the original web site or a mirror web site. Typically, participants should connect to a nearest web site or a least busy web site to reduce the connection latency.

Additionally, one or more embodiments may be implemented to facilitate remote collaboration. Remote collaboration usually takes places over several connected local networks. For instance, a corporation may have multiple remote offices and each office is running a local-area network (LAN). The local networks are connected using the Internet or wide-area network (WAN). Within a LAN, computers are connected at very high speed, typically 100 times faster than that of a WAN.

A hybrid system that implements aspects of a peer-to-peer network can exploit the clustering of clients in high-speed local networks. When the first client in a local network is connected to a web server, the client's IP address is recorded on the server. Subsequent clients from the same network can connect to the first client using a peer-to-peer connection instead of connecting directly to the web server. The second client's connection latency is only slightly increased as the peer-to-peer connections are over high-speed local area networks. Since all the peer-to-peer connections are in the same local network, there is no issue with a firewall or need for a public IP address.

The first client can set a limit of peer-to-peer connections allowed so as to not unduly impede its performance. When such limit is reached, a new client from the local network needs to connect directly to the web server and it can in turn accept other peer-to-peer clients until its limit is reached.

The binding between direct-connecting client (i.e. clients connect directly to the web server) and peer-to-peer clients should be determined dynamically on every request as the direct-connecting client may drop out anytime during the collaboration session.

Embodiments that incorporate such peer-to-peer connectivity improve the scalability of the overall system, as only a small number of clients need to connect directly to the web server.

Role Implementation

As described with an embodiment of FIG. 1, client application 108 may include components of the presenter role and the application-client participant. An embodiment provides that any terminal on which client application 108 resides may act as both presenter and recipient during a single online collaboration session. Moreover, a recipient of a particular set of collaboration data may modify and present it for others in the collaboration session, including the original presenter. For example, each client terminal (whether presenter or participant) may programmatically track the sequence number of files uploaded for collaboration data. A new presenter may simply upload the file that is to be shared, using the updated sequence number. The other terminals (including the presenter) may make programmatic requests from the web server 120 using the same updated sequence number. Thus, the collaboration data may be provided by any of the participant of the collaboration session.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for making data available to one or more participants of a live online collaboration session, the method being performed by one or more processors and comprising:
on a terminal:
capturing continuous data from operation of an application on the terminal;
preparing a formatted continuous data set from the captured continuous data, wherein the formatted continuous data is suitable for client-server communications, and wherein the formatted continuous data set is configured with characteristics to enable a server to respond to requests from one or more terminals operated by any of the one or more participants by transmitting data from the formatted continuous data set to those terminals; and
during the live online collaboration session, causing transmission of the formatted continuous data set to the server in one or more discrete and independent communications, wherein multiple data frames from the formatted continuous data set are each transmitted to the server in a single discrete and independent communication, wherein the server does not require the terminal or any of the one or more terminals operated by any of the one or more participants to be connected to the server concurrently to share the formatted continuous data set with the one or more terminals operated by any of the one or more participants during the live online collaboration session.

2. The method of claim 1, wherein the continuous data comprises multiple frames of at least one of audio and video data captured in a given duration of time and wherein preparing a formatted continuous data set includes preparing the formatted continuous data set so the server can transmit the data from the formatted continuous data set to the one or more terminals using communications that are discrete and independent.

3. The method of claim 1, wherein capturing the continuous data includes copying continuous data generated by one or more applications executing on the terminal.

4. The method of claim 3, wherein the continuous data comprises video data, the method further comprising capturing a data set that includes data corresponding to content displayed on the terminal.

5. The method of claim 1, wherein capturing the continuous data includes capturing a plurality of data frames, wherein each data frame corresponds to data continuously generated on the terminal for a given duration of time, wherein each data frame is sequenced with respect to the other data frames in the plurality of data frames, and wherein a plurality of the data frames are transmitted in a discrete and independent communication.

6. The method of claim 5, wherein preparing the formatted continuous data set includes providing a sequence identifier for each of the data frames in the plurality of data frames, wherein each sequence identifier corresponds to a sequence of that data frame with respect to other data frames in the plurality of data frames.

7. The method of claim 1, wherein preparing the formatted continuous data set includes preparing each data set as a data frame having a sequence identifier that corresponds to a sequence in which data contained in that data frame was generated, and wherein the method further comprises providing the server with a programmatic mechanism to enable the server to respond to requests from a recipient request that includes a given sequence identifier by rejecting the request when (i) the data frame with the given sequence identifier has not been received by the server, or (ii) when the programmatic mechanism specifies that recipient making the given request is not to receive the data frame with the given sequence identifier even when that data frame has been received by the server.

8. The method of claim 1, wherein preparing the formatted continuous data set from the captured data includes generating the formatted continuous data set to be suitable for transport using one or more of an HTTP or FTP transport protocol.

9. The method of claim 1, wherein preparing the formatted continuous data set from the captured continuous data includes configuring the formatted continuous data set with characteristics to enable the formatted continuous data set to be stored and retrieved from the server in response to the requests from the one or more terminals of the one or more participants.

10. The method of claim 9, wherein configuring the formatted continuous data set with characteristics includes configuring the formatted continuous data set with an identifier that can be used by the server in responding to the requests from the one or more terminals of the one or more participants that include the identifier.

11. The method of claim 10, wherein configuring the formatted continuous data set with characteristics includes packaging the data to be stored as file with the identifier on the server.

12. The method of claim 10, wherein configuring the formatted continuous data set with characteristics includes packaging the data to be stored as a database entry with the identifier on the server.

13. The method of claim 1, wherein preparing the formatted continuous data set includes making the formatted continuous data set renderable from the server to a browser of a given one of the terminals when a corresponding request is made from that terminal.

14. The method of claim 13, wherein making the formatted continuous data set renderable from the server to a browser includes providing the server with a script that is to be transmitted to the browser of the given terminal when the corresponding request is made.

15. The method of claim 13, wherein making the formatted continuous data set renderable from the server to a browser includes using a markup language for the browser.

16. The method of claim 1, wherein the method further comprises, specifying, on the terminal, a network location for the server to retrieve data from the formatted continuous data set when responding to the requests from the one or more terminals.

17. The method of claim 11, wherein specifying a network location includes generating a resource locator that is to be used by the one or more terminals in making the requests for data from the formatted continuous data set.

18. The method of claim 17, further comprising the step of communicating the resource locator to the one or more participants.

19. The method of claim 1, wherein causing transmission of the formatted continuous data set includes transmitting the formatted continuous data set so as to enable the server to receive the formatted continuous data set without the server having to maintain continuous operation of a process to receive the formatted continuous data set throughout a duration of the online collaboration session.

20. The method of claim 1, wherein preparing the formatted continuous data set from the captured continuous data includes converting the continuous data set from the native format to a second format suitable for client-server communications, so that the server's receiving and transmitting the formatted continuous data is performed without the server executing any continuous process to maintain communications with the terminal or the one or more participants.

21. A client terminal configured to be operated by a first participant, comprising:
a computer-readable medium comprising instructions stored thereon, the instructions including:
a data capture module configured to capture at least one of continuous audio and video data during a live collaboration session;
a data preparation module configured to format the continuous data captured by the data capture module into formatted data that is suitable for client-server communications, wherein the formatted data is configured with characteristics to enable a server to respond to requests from one or more terminals operated by other participants by transmitting portions of the formatted data to those terminals; and
a transmission module configured to transmit the formatted data to the server in one or more discrete and independent communications during the live collaboration session between the client terminal and the one or more terminals operated by other participants, wherein the formatted data transmitted in a discrete and independent communication comprises multiple data frames captured in a given duration of time, and wherein the server does not require the client terminal or any of the one or more terminals operated by any of the one or more participants to be connected to the server concurrently to share the formatted data with the one or more terminals operated by any of the one or more participant during the live collaboration session; and
a processor configured to execute the instructions stored on the computer-readable medium.

22. A web server configured to facilitate a live collaboration session between a first client terminal operated by a first participant and at least one other client terminal operated by at least one other participant, the web server configured to receive a formatted data set from the first client terminal during the live collaboration session and store the formatted data set in a data store until at least a portion of the formatted data set is requested by the at least one other client terminal, wherein the formatted data set received by the web server comprises a plurality of frames of continuous data received in a discrete and independent communication during the live collaboration session, wherein the web server does not require the first client terminal or the at least one other client terminal to be connected to the web server concurrently to share the formatted data set with the at least one other client terminal during the live collaboration session.

* * * * *